(12) United States Patent
Nakamura

(10) Patent No.: US 6,556,793 B2
(45) Date of Patent: Apr. 29, 2003

(54) IMAGE FORMING APPARATUS ADJUSTING CONCENTRATION OF GRAY WITH IMPROVED REFERENCE AND TEST PATTERNS

(75) Inventor: Satoru Nakamura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/978,070

(22) Filed: Oct. 17, 2001

(65) Prior Publication Data
US 2002/0054769 A1 May 9, 2002

(30) Foreign Application Priority Data

Oct. 18, 2000 (JP) .................................. 2000-318299
Mar. 14, 2001 (JP) .................................. 2000-071659
Mar. 23, 2001 (JP) .................................. 2001-085716

(51) Int. Cl.⁷ ............................. G03G 15/00; B41J 2/47
(52) U.S. Cl. ................... 399/15; 347/240; 347/251; 347/254; 399/39; 399/49; 399/72
(58) Field of Search ............................. 347/240, 251, 347/254; 358/1.9; 382/167; 399/15, 39, 40, 49, 72, 181

(56) References Cited

U.S. PATENT DOCUMENTS 5,579,031 A 11/1996 Liang
6,215,562 B1 * 4/2001 Michel et al. ............... 358/1.9

FOREIGN PATENT DOCUMENTS

| EP | 0 794 657 A2 | 10/1997 |
| JP | 10322564 A | 4/1998 |
| JP | 2001130056 A | 5/2001 |
| JP | 2002142116 A | 5/2002 |
| WO | WO 00/36819 | 6/2000 |

* cited by examiner

Primary Examiner—Hoang Ngo
(74) Attorney, Agent, or Firm—Dickstein Shapiro Morin & Oshinsky LLP

(57) ABSTRACT

An image forming apparatus lessens the sense of incongruity between CMY mixture gray and K monochrome gray so as to achieve an easy color adjustment. An adjustment sheet is printed by the image forming apparatus. The adjustment sheet has a reference pattern and a plurality of test patterns. The reference pattern indicates a reference concentration of gray and the test patterns indicates concentrations of gray within a predetermined concentration range including the reference concentration. The gray of the test patterns is a mixture of cyan, magenta, yellow and black. The gray of the reference pattern is monochromatic black. The test patterns are visually compared with the reference pattern so as to select one of the test patterns of which concentration matches the concentration of the reference pattern. The concentration of gray is adjusted in accordance with the concentration of the selected one of test patterns.

20 Claims, 14 Drawing Sheets

(ENGINE CHARACTERISTIC)

(CHARACTERISTIC AFTER AGING)

(TARGET γ)

(CORRECTED γ)

(CORRECTED γ)

(DITHER CHARACTERISTIC FOR EACH MODE)

FIG.22A DIFFERENCE IN SETTING OF 600 dpi AND 1200 dpi
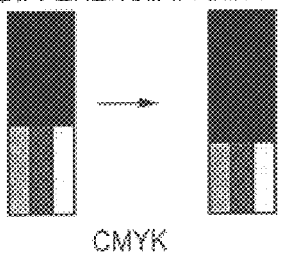
CMYK
FIG.22B DIFFERENCE IN SETTING OF PRINTER ENGINES A AND B
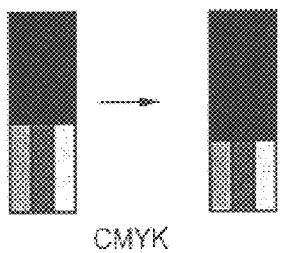
CMYK
FIG.22C DIFFERENCE IN CONSUMABLE PARTS COUNTER VALUES OF 1000 AND 3000
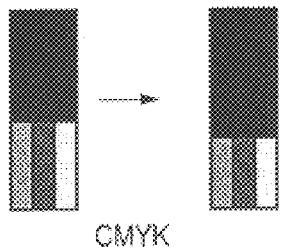
CMYK
FIG.22D DIFFERENCE IN AMOUNT OF REMAINING TONER 100% AND 10%
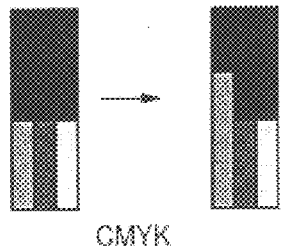
CMYK
FIG.22E DIFFERENCE IN EACH COLOR CONCENTRATION
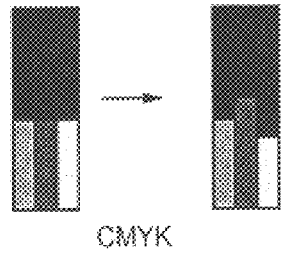
CMYK

FIG.23A CMY CONCENTRATION TABLE FOR RESOLUTION

|     | 1200dpi | 600dpi |
| --- | --- | --- |
| CMY | 10% | 14% |

FIG.23B CMY CONCENTRATION TABLE FOR PRINTER ENGINE

|     | ENGINE A | ENGINE B |
| --- | --- | --- |
| CMY | 10% | 7% |

FIG.23C CMY CONCENTRATION TABLE FOR CONSUMABLE PARTS COUNTER

|     | 0 | 1000 | 2000 | 3000 |
| --- | --- | --- | --- | --- |
| CMY | 10% | 14% | 10% | 7% |

FIG.23D CMY CONCENTRATION TABLE FOR AMOUNT OF REMAINING TONER

|     | 100% | 80% | 10% |
| --- | --- | --- | --- |
| CMY | 10% | 11% | 15% |

FIG.23E CMY CONCENTRATION TABLE FOR EACH COLOR

|     | 100% | 80% | 10% |
| --- | --- | --- | --- |
| C | 10% | 12% | 14% |
| M | 10% | 11% | 16% |
| Y | 10% | 10% | 15% |

IMAGE FORMING APPARATUS ADJUSTING CONCENTRATION OF GRAY WITH IMPROVED REFERENCE AND TEST PATTERNS

BACKGROUND OF THE INVENTION

1. Field of the Invention

The present invention generally relates to image forming apparatuses and, more particularly, to an image forming apparatus, such as a copying machine, a printer or a facsimile, which creates an adjustment sheet used for concentration adjustment (γ-correction) of reference colors which constitute a color printing output image.

2. Description of the Related Art

In an image forming apparatus, such as a color printer, a color concentration of printing may shift from a reference value due to change with passage of time, and, thus, it is required to make a color correction. Conventional image forming apparatuses adopt various color correction methods.

For example, there is a method of determining an amount of correction of concentration by comparing a color sample sheet enclosed in a package of a printer with a print of a test pattern, which is stored in the printer. Moreover, there is a method of correcting a concentration curve by reading concentration of a figure printed on a print paper by a scanner or a concentration measurement apparatus and calculating a difference between a color of the drawn figure and an actual color. Furthermore, there is a method of correcting a concentration curve by selecting a concentration, which is equal to a reference concentration printed on a previously prepared template, the selection being made by printing all selectable concentrations on a print paper by a printer of which concentration curve is to be corrected.

A concentration value of print data sent from a host apparatus to an image forming apparatuses such as a printer is normally specified by one of numerical values of 0 to 255 expressed by 8 bits per one color. A process called γ-conversion is performed so that the concentration in a printing result matches a desired concentration with respect to each concentration value. The γ-conversion is a process that obtains, when a concentration is expressed by 8 bits, output values 0–255 with respect to input values 0–255 using a conversion table stored in a memory of a controller.

In a graph having horizontal and vertical axes of the same scale, if an input value is assigned to the horizontal axis and an output value is assigned to the vertical axis, the input value becomes equal to the output value and the γ-conversion process is unnecessary when the input-and-output characteristic of a printer engine is expressed by a straight line having an inclination of 45 degrees. However, the input-and-output characteristic of a printer engine does not have linearity, and the γ-conversion process is indispensable so as to obtain a proper image by the printer.

Moreover, even if printer engines are of the same model, generally the input-and-output characteristic varies according to individual differences. The input-and-output characteristic varies also with passage of time and further the environment where the printer is placed. Therefore, it is necessary to rewrite the contents of the conversion table in accordance with a change in the input-and-output characteristic.

If the contents of γ-conversion table are expressed by a graph in which an input value and an output value are assigned to the horizontal axis and the vertical axis, respectively, the γ-conversion table is indicated as a curve. For this reason, the process to rewrite the contents of γ-conversion table may be referred to as a "gamma curve correction". Moreover, the contents of γ-conversion table after correction may be referred to as "corrected γ" or "corrected γ-curve".

FIG. 1 is an illustration showing a structure of a conventional printer system. The printer system shown in FIG. 1 comprises a host computer 1 and a printer engine 2. A printer controller 3 is provided in the printer engine 2. The data to be printed is specified by the host computer 1. The printer controller 3 creates image data according to instructions of the host computer 1 so as to perform a printing operation. After being developed on the frame memory according to the specified concentration, the image data to be printed is sent to the printer engine 2, and the printing operation is completed.

As shown in FIG. 2, the printer engine 2 comprises a central processing unit (CPU) 31, a random access memory (RAM) 32, a program read only memory (ROM) 33, a font ROM 34, a host interface (I/F) 35 and an engine I/F 36, and these parts are mutually connected through a bus. The CPU 31 controls the entire printer controller 3 based on programs stored in the program ROM 33, mode instructions from a panel apparatus and commands from the host computer 1. As mentioned above, a control program of the printer controller 3 is stored in the program ROM 33, and pattern data of a font etc. is stored in the font ROM 34.

The RAM 32 functions as a work memory of the CPU 31, and is used as an input buffer of input data, a page buffer of print data, a memory for download fonts, etc. The engine I/F 36 performs communication with the printer engine 2 so as to exchange commands and status and print data. The host I/F 35 is an interface which communicates with the host computer 1, and is usually Centronics I/F or RS232C I/F. The printer engine 2 may be connected with the host computer 1 through networks such as Ether Net or Local Talk.

Here, a concentration of an image printed by the printer engine may differ from a concentration which the printer controller intends to print due to a change in the surrounding environment or a change with passage of time. In such as case, in the printer controller provided with a reading apparatus such as a scanner, the printed paper output from the printer engine is read by the scanner. Then, the concentration value (output result), which is the result of reading, is compared with the concentration value (expected output value) which the printer controller intends to print. If there is a difference, the concentration value used for drawing is corrected (the above-mentioned γ-correction) so as to absorb the difference. Then, a printed matter can be obtained which the printer controller intends to, that is, which the host computer intends to.

In an image forming apparatus which is not provided with a reading apparatus such as a scanner, the same effect can be obtained by inputting the input data to the printer controller 3 by determining, as shown in FIG. 3, whether the printed result output from the printer engine 2 has a higher concentration or a lower concentration by a visual check of a human 4 without using a reading apparatus such as a scanner. In this case, since it is difficult to determine the concentration by human eyes unlike reading apparatuses such as a scanner, a sheet referred to as an adjustment sheet 5 is used so as to help the visual check so that the determination can easily made even by the human eyes.

In the adjustment sheet 5, when an adjustment is performed with respect a particular concentration, reference concentration patterns (B of FIG. 4) used as a reference and test concentration patterns (A of FIG. 4) which indicates concentrations near the particular concentration including the particular concentration are arranged in an alternative sequence. By comparing the concentration patterns and selecting a number at which the concentration of the test concentration pattern matches the concentration of the reference concentration pattern, the γ-correction value is obtained based on the concentration value (output result) indicated by the number attached to the selected test concentration pattern and the concentration values (expected output value) which the controller intends to represent. Thus, a desired concentration can be obtained by reflecting the thus-obtained γ-correction in the printing process. It should be noted that an example of such a process is disclosed in Japanese Patent Application No. 11-314395 filed by the present inventor. As for the reference concentration pattern, a pattern, which is hardly influenced by a change with passage of time or an individual difference, is used. For example, what is necessary to make 50% of concentration of the highest concentration of the printer engine 2 is just to use a checkered pattern as shown in FIG. 5. However, if each dot constituting the pattern corresponds to a single pixel (dot) of the printer engine 2, 50% concentration cannot be made stably since the concentration is influenced by the output characteristic of the printer engine 2. Therefore, the pattern, which is not influenced by the output characteristic, can be made by using the checkered pattern (FIG. 6) in which a constituting point consists of several dots. By performing the above-mentioned process, an adjustment of output characteristic, that is, an adjustment of concentration can be achieved even by a printer controller having no image reading apparatus.

In a case of a color printer, a concentration adjustment must be performed on colors other than black (hereafter may be referred to as "K"), such as cyan (may be referred to as "C"), magenta (may be referred to as "M") and yellow (may be referred to as "Y"). With respect to magenta and black, the concentration adjustment method using the above-mentioned adjustment sheet shown in FIG. 4 is performed for each individual color. With respect to cyan and yellow, a color mixture gray patch (refer to a section E of FIG. 7), which consists of cyan, magenta and yellow, is output by printing, and comparison is made with the black background (refer to a section D of FIG. 7) which represents the reference concentration. Accordingly, the concentration adjustment is performed on all four colors. However, in many cases, color tone appears in the gray (CMY mixture gray) created by blending C, M and Y, which gives a user a delicately different impression when comparing with a monochrome gray representing the reference concentration. Therefore, it is difficult to select a patch having the same concentration with the reference concentration, and variation may be made by each person who performs the test.

On the other hand, the printer controller has drawing modes such as resolution or character/photograph, and if the mode is different, the concentration of output from the printer engine may also differ. For example, a phenomenon either dark or light happens in the result of output according to a resolution of 600 dpi and the result of output according to a resolution of 1200 dpi. Moreover, there is a case in which a plurality of printer engines are assigned to a printer controller. In such a case, it is natural that the result of output differs. Further, also in the same printer engine, the result of output changes according to an amount of toner used or a service time of consumable parts. Furthermore, in the case of a color printer, the concentration characteristics differ also among composition reference colors (cyan, magenta, yellow, black, etc.). The amounts of C, M and Y blended vary due to the difference in output, and it is considered that a CMYK gray patch does not serve as a reference.

SUMMARY OF THE INVENTION

It is a general object of the present invention to provide an image forming apparatus in which the above-mentioned problems are eliminated.

A more specific object of the present invention is to provide an image forming apparatus which lessens the sense of incongruity between CMY mixture gray and K monochrome gray so as to achieve an easy color adjustment.

In order to achieve the above-mentioned objects, there is provided according to one aspect of the present invention an image forming apparatus comprising: concentration pattern data producing means for producing reference concentration pattern data and adjustment concentration pattern data, the reference concentration pattern data representing a predetermined reference concentration and the adjustment concentration pattern data representing a plurality of concentrations within a predetermined concentration range including the predetermined reference concentration; printing means for printing an adjustment sheet based on the reference pattern data and the adjustment concentration pattern data so that a reference pattern and a plurality of test patterns are printed on the adjustment sheet, the reference pattern indicating the predetermined reference concentration and the test patterns indicating the concentrations indicated by the adjustment concentration pattern data; and concentration adjusting means for adjusting concentration data of image data to be printed in accordance with an adjustment concentration value detected by comparing a concentration of the reference pattern with concentrations of the test patterns printed on the adjustment sheet, wherein the concentration pattern data producing means produces the reference concentration pattern data and the adjustment concentration pattern data so that one of a color of the reference pattern and a color of the test patterns is added to the other of the color of the test pattern and the color of the test patterns.

In one embodiment of the present invention, the color of the reference pattern may be gray consisting of monochromatic black, and the color of the test patterns may be gray consisting of a mixture of cyan, magenta and yellow, and wherein the concentration pattern data producing means produces the reference concentration pattern data and the adjustment concentration pattern data so as to add the color of the reference pattern to the color of the test patterns so that the printing means prints the reference pattern in gray consisting of monochromatic black and prints the test patterns in gray which is a mixture of cyan, magenta yellow and black.

In another embodiment of the present invention, the color of the reference pattern may be gray consisting of monochromatic black, and the color of the test patterns may be gray consisting of a mixture of cyan, magenta and yellow, and wherein the concentration pattern data producing means produces the reference concentration pattern data and the adjustment concentration pattern data so as to add the color of the test patterns to the color of the reference patterns so that the printing means prints the reference pattern in gray consisting of monochromatic black and a mixture of cyan, magenta and yellow, and prints the test patterns in gray consisting of cyan, magenta and yellow.

Additionally, there is provided according to another aspect of the present invention a method of adjusting a concentration of gray in a color image printed by an image forming apparatus, comprising the steps of: preparing a reference pattern and a plurality of test concentration patterns by the image forming apparatus, the reference pattern indicating a reference concentration of gray and the test patterns indicating concentrations of gray within a predetermined concentration range including the reference concentration, the gray of the test patterns being a mixture of cyan, magenta, yellow and black, the gray of the reference pattern being monochromatic black; visually comparing the test patterns with the reference pattern so as to select one of the test patterns of which concentration matches the concentration of the reference pattern; and adjusting the concentration of gray in accordance with the concentration of the selected one of test patterns.

Further, there is provided according to another aspect of the present invention a method of adjusting a concentration of gray in a color image printed by an image forming apparatus, comprising the steps of: preparing a reference pattern and a plurality of test concentration patterns by the image forming apparatus, the reference pattern indicating a reference concentration of gray and the test patterns indicating concentrations of gray within a predetermined concentration range including the reference concentration, the gray of the test patterns being a mixture of cyan, magenta and yellow, the gray of the reference pattern being a mixture of cyan, magenta, yellow and black; visually comparing the test patterns with the reference pattern so as to select one of the test patterns of which concentration matches the concentration of the reference pattern; and adjusting the concentration of gray in accordance with the concentration of the selected one of test patterns.

Additionally, there is provided according to one aspect of the present invention a processor readable medium which stores a program for causing a computer to carry out the above-mentioned methods.

Other objects, features and advantages of the present invention will become more apparent from the following detailed description when read in conjunction with the accompanying drawings.

BRIEF DESCRIPTION OF THE DRAWINGS

FIGS. 22A–22E are illustrations showing a change in a concentration of CMY to be added to a K gray patch according to various changes in operating conditions; and FIGS. 23A–23E are illustration showing examples of contents of data stored in a nonvolatile memory.

DETAILED DESCRIPTION OF THE PREFERRED EMBODIMENTS

A description will now be given of a first embodiment of the present invention.

Figure 1:
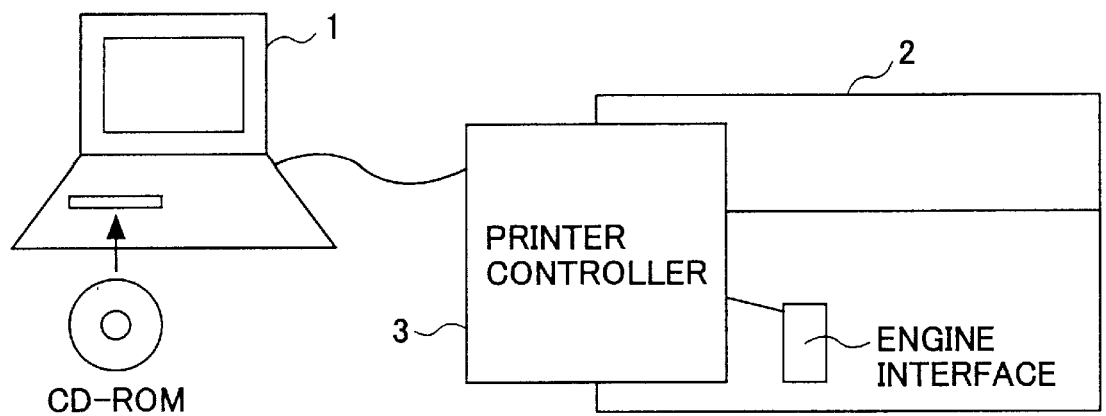
FIG. 1 is an illustration showing a structure of a conventional print system.
Figure 2:
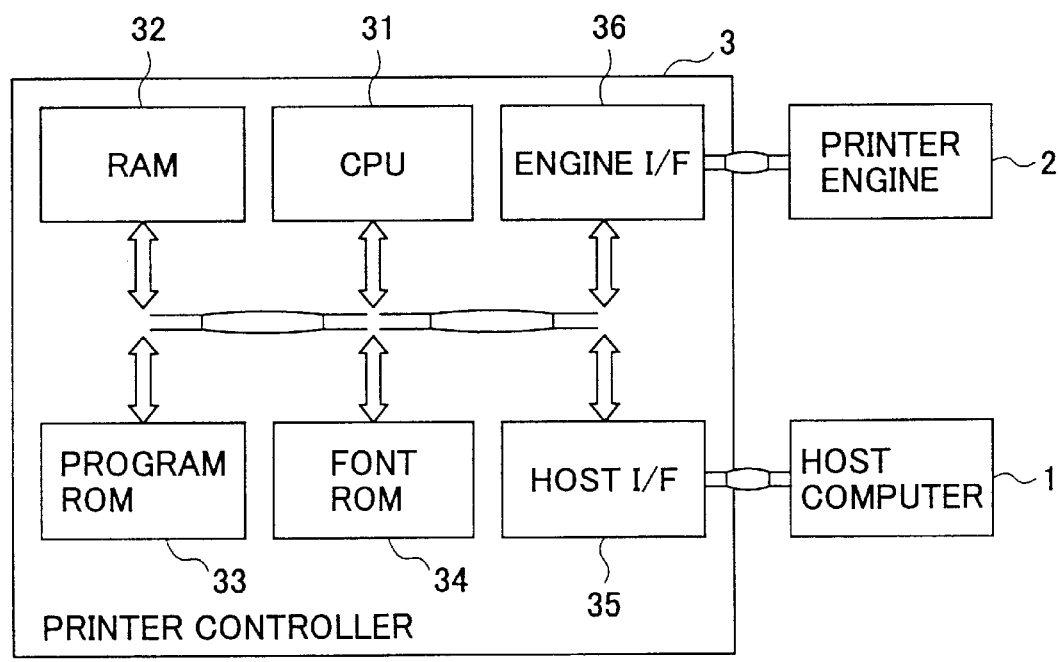
FIG. 2 is a block diagram of a printer controller shown in FIG. 1.
Figure 3:
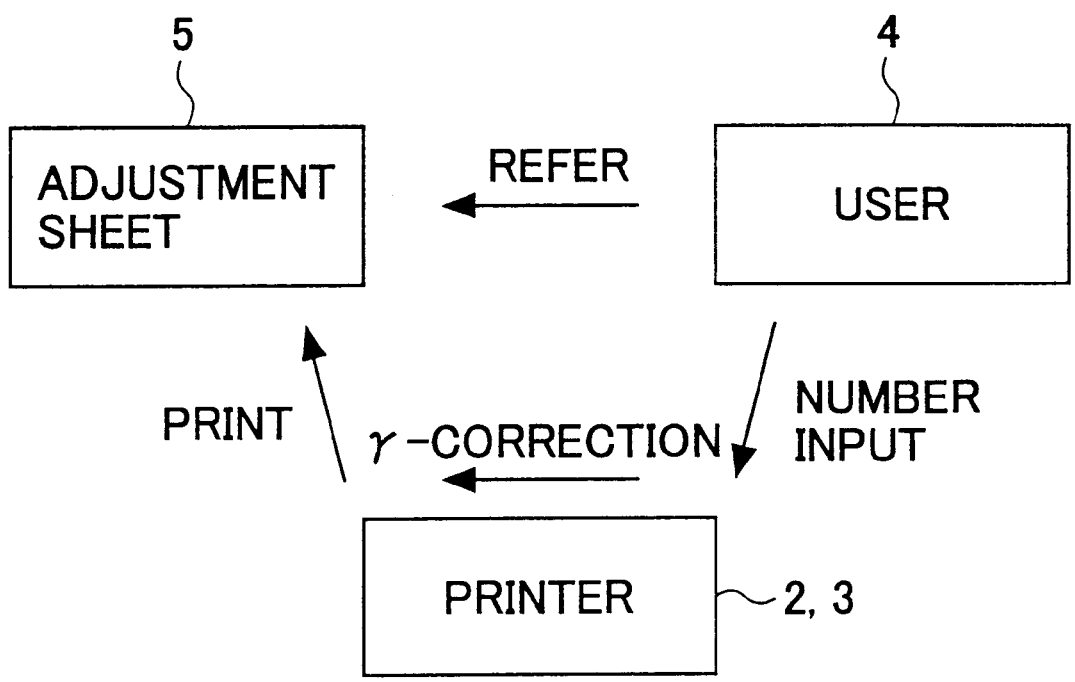
FIG. 3 is an illustration for explaining a procedure of concentration adjusting operation by a user.

Basically, a printer which carries out the present invention has the same composition as the printer shown in FIG. 1, and a reference is made to the previous explanation with respect to FIG. 1. In the present embodiment, basically the adjustment sheet having the color mixture gray patch, which consists of cyan, magenta and yellow, is created by the printer of FIG. 1 so as to carry out a concentration adjustment of reference colors that constitute a color printing output image. FIG. 2 shows a basic procedure for carrying out the above-mentioned adjustment sheet method. According to the procedure shown in FIG. 2, (1) the printing output of the adjustment sheet is carried out under a predetermined printing condition. (2) A user compares visually the reference concentration patterns printed on the adjustment sheet with the concentration patterns for adjustment printed according to a plurality of concentrations within a predetermined range including the reference concentration. Thereafter, the user specifies the concentration pattern for adjustment judged to be the same concentration as the reference concentration pattern (that is, the concentration value when being drawn under the condition of actual use is calculated as a relative value with respect to the reference concentration), and gets the number attached to the specified concentration pattern for adjustment. (3) The user inputs the concentration value (result of output) to the printer as a setting value for concentration adjustment, the concentration value being indicated by the number attached to the concentration patterns for adjustment obtained in the above-mentioned process (2). (4) The printer obtains the adjustment value of γ-correction from the number (concentration value when being drawn under the condition actually used) set up by the above-mentioned process (3) and the concentration value (expected output value) which the controller intends to print, and performs a γ-calculation to reflect the result of correction at the time of drawing.

Figure 8:
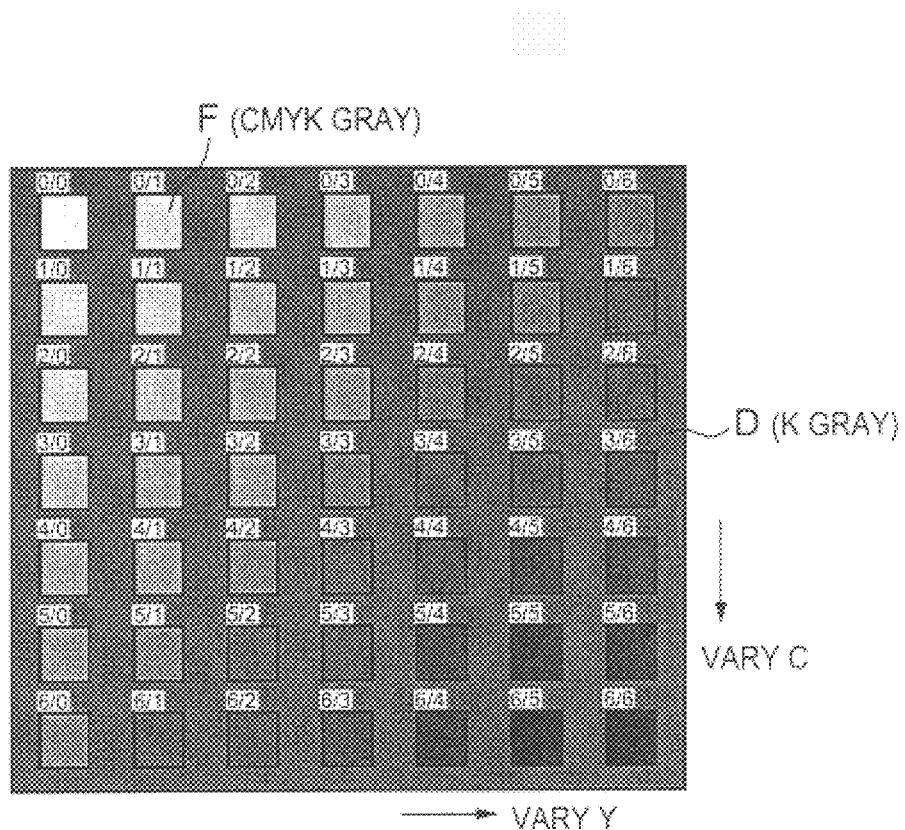
FIG. 8 is an illustration of an adjustment sheet according to a first embodiment of the present invention.

The adjustment sheet created by above-mentioned process (1) is explained below in detail. FIG. 8 is an illustration showing the adjustment sheet according to the present embodiment. In the present embodiment, with respect to a concentration to be adjusted, a comparison is made between the gray patch (a section D of FIG. 8) of a reference concentration and a plurality of gray patches (sections F of FIG. 8), which are selected from a predetermined concentration range including the reference concentration and are drawn under the condition of actual use. The gray patch of the section D corresponds to a reference pattern, and the gray patches F correspond to test patterns. In order to make the comparison easy, in the example shown in FIG. 8, the section D is made to be a background and the sections F are made to be a plurality of square areas arranged on the background. That is, each of the areas corresponding to the sections F to be compared is arranged so that each section F is surrounded by the background section D.

Here, in the present embodiment, the gray patch D of the reference concentration consists of monochrome black (K). In addition, the concentration pattern used as a reference is made to be a pattern which is not influenced by a change with passage of time, individual variation of the printer engine or output conditions. Reference is made to the above-mentioned explanation for a method of producing such a pattern. Although the gray patches F of M-K which are the CMYK mixture gray patches arranged in a matrix consist of a constant M-K, color concentration of Y increases rightward along the row and color concentration of C increases downward along the column. A number is given to each of the plurality of gray patches F for concentration adjustment.

A user operates the printer to output the adjustment sheet shown in FIG. 8, and selects a number given to one of the CMYK mixture gray patches F which appears to be the same concentration as the gray patch D of the reference concentration (in the example of illustration, the patch with a number 3/3 indicates the same concentration). Then, the user sets an adjustment value in the printer by inputting the selected number in the printer so as to reflect the adjustment value in the γ-correction.

Figure 7:
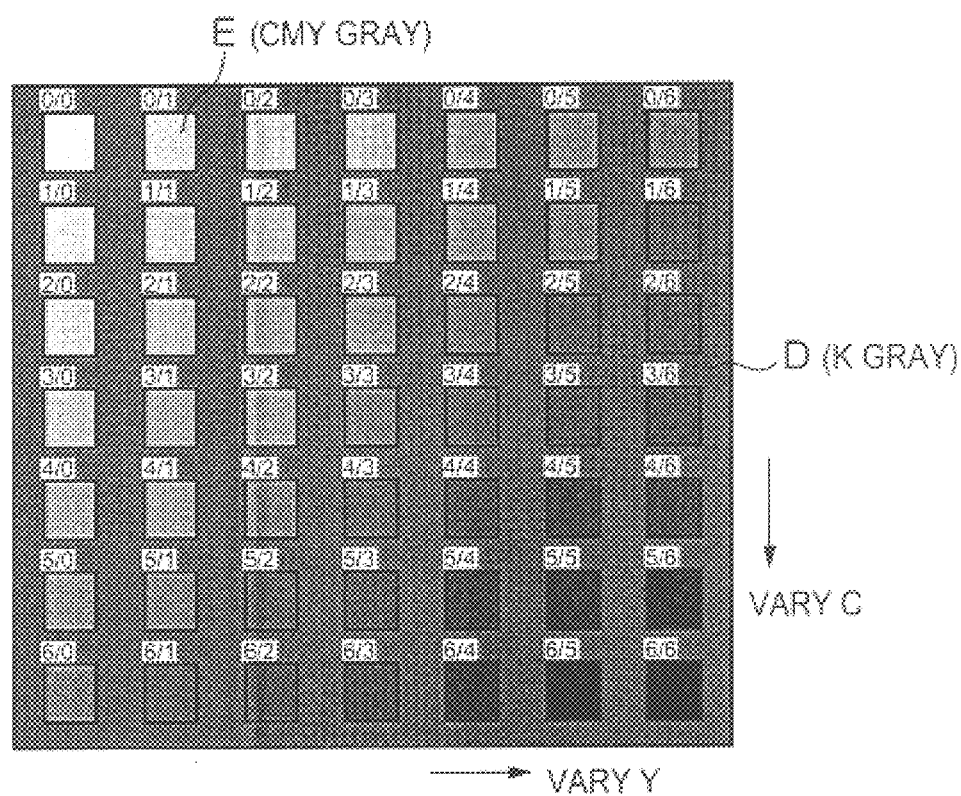
FIG. 7 is an illustration of an adjustment sheet having gray adjustment patches.
Figure 9A:
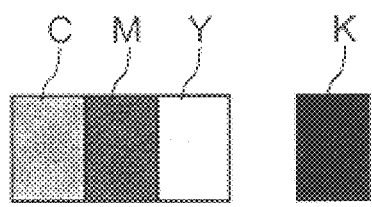
FIGS. 9A and 9B are illustrations showing examples of percentage (area ratio) of an adjustment concentration gray patch and a reference concentration gray patch.
Figure 9B:
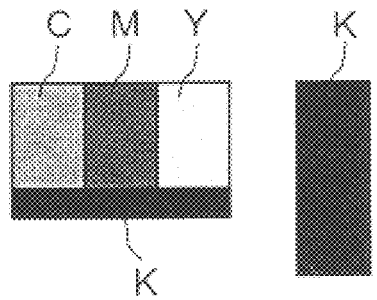

FIGS. 9A and 9B are illustrations showing examples of percentage (area ratio) of an adjustment concentration gray patch and a reference concentration gray patch. FIG. 9A shows the adjustment concentration gray patch E of CMY mixture shown in FIG. 7. FIG. 9B shows the percentage (area ratio) of the adjustment concentration gray patch F of CMYK mixture, and the standard concentration gray patch D of K monochrome by the present embodiment. If a case is take for an example where a concentration of black to be adjusted is 25%, in the printing of the adjustment sheet shown in FIG. 7, K concentration (concentration of the section D of FIG. 7) of a reference concentration gray patch is 25%, and CMY concentrations (concentrations of the sections E of FIG. 7) of the adjustment concentration gray patch of CMY mixture are 25%. If the percentage of each color is represented by an area ratio, the ratio becomes that shown in FIG. 9A. The adjustment sheet is printed with the square adjustment concentration gray patches E of CMY mixture being printed on the gray patch D of the reference concentration which was printed according to the area ratio by changing the constitution ratio of C and Y as shown in FIG. 7. A user obtains a desired constitution ratio of C and Y by selecting one of the adjustment concentration gray patches E of CYM mixture which matches the K gray of the reference concentration which is the background. However, in the adjustment sheet shown in FIG. 7, a color tone appears in the CMY mixture adjustment concentration gray patches E, and such a gray patch is difficult to be fit in the background having a reference concentration of a single gray. Therefore, it is difficult to select the patch having the same concentration, which causes variation of selection by each individual user carrying out the test.

In the present embodiment, the color tone of the CMYK gray patches F is made less recognizable by adding K to the CMY mixture adjustment concentration gray patches so as to raise the overall concentration. Thereby, the CMYK gray patches F according to the present embodiment fits in the K gray patch D of the reference concentration of the background, and the judgment becomes easy when judging whether the CMYK gray patch F has the same concentration with the K gray patch D. As shown in FIG. 9B which shows one example of the percentage (area ratio) of the CMY mixture adjustment concentration gray patches F according to the present embodiment and the K gray patch D of the reference concentration, K is further added to the CMY mixture gray patches so as to produce the CMYK mixture gray patches F. Comparing with the example of FIG. 9A, although the example shown in FIG. 9B has a concentration higher than that corresponding to the added K, the concentration value can be adjusted by adjusting the constitution ratio. In addition, as shown in FIG. 9B, the concentration of the background K gray patch D must be raised so as to achieve an area ratio corresponding to the same concentration so that the concentration of the K gray patch D matches the overall concentration of the CMKY mixture gray patch F after adding K. Moreover, when adding K to CMY, the concentration of K to be added cannot be uniquely determined since it is supposed that the concentration of K to be added differs from concentration of a color tone appearing in the CMY gray, the concentration to be adjusted or a color distribution of toner ink. However, it is possible to find out experimentally the concentration of K by which a color tone is less recognizable by determining a target at the time of design. According to the result of experiments, with a certain printer engine, the CMYK mixture gray patches F having less color tone were able to be produced by adding 10% K to a 25% patch (CMY 25% each).

Figure 4:
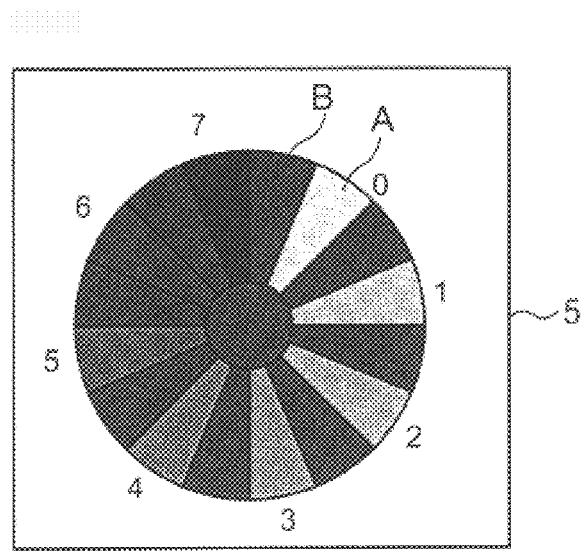
FIG. 4 is an illustration of a concentration adjustment sheet.
Figure 5:
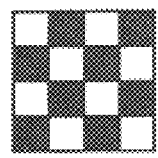
FIG. 5 is an illustration showing a pattern when a concentration is 50%.
Figure 6:
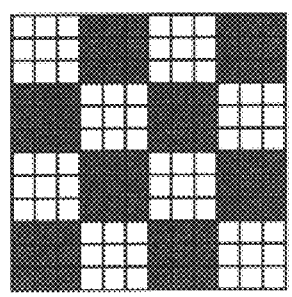
FIG. 6 is an illustration of a checkered pattern when a concentration is 50%.

In the above-mentioned embodiment, when performing a concentration adjustment of CMY, the adjustment sheet according to the pattern shown in FIG. 4 is used with respect to M, and C and Y are adjusted using the adjustment sheet according to the pattern shown in FIG. 8 in which the percentage (area ratio) of M is fixed. Although it is preferable to use the adjustment sheet according to the pattern shown in FIG. 4 with respect to M considering the conspicuousness when carrying out a visual judgment, C or M may be selected instead of M. When drawing the pattern shown in FIG. 4 by C, the concentration of M and Y are adjusted by using the pattern shown in FIG. 8. Moreover, when drawing the pattern shown in FIG. 4 by Y, the concentration of C and M are adjusted by using the pattern shown in FIG. 8.

According to the adjustment sheet using the above-mentioned CMYK gray patches F, the adjustment values of CMY of the 4-color concentration adjustment can be accurately calculated. Moreover, although the calculated adjustment value is set in a printer so as to be reflected in a γ-correction when a printing operation is actually performed, the γ-correction is the same as that of a single color.

It should be noted that the details of γ-correction calculation are disclosed in Japanese Patent Application No. 11-314395.

Figure 10:
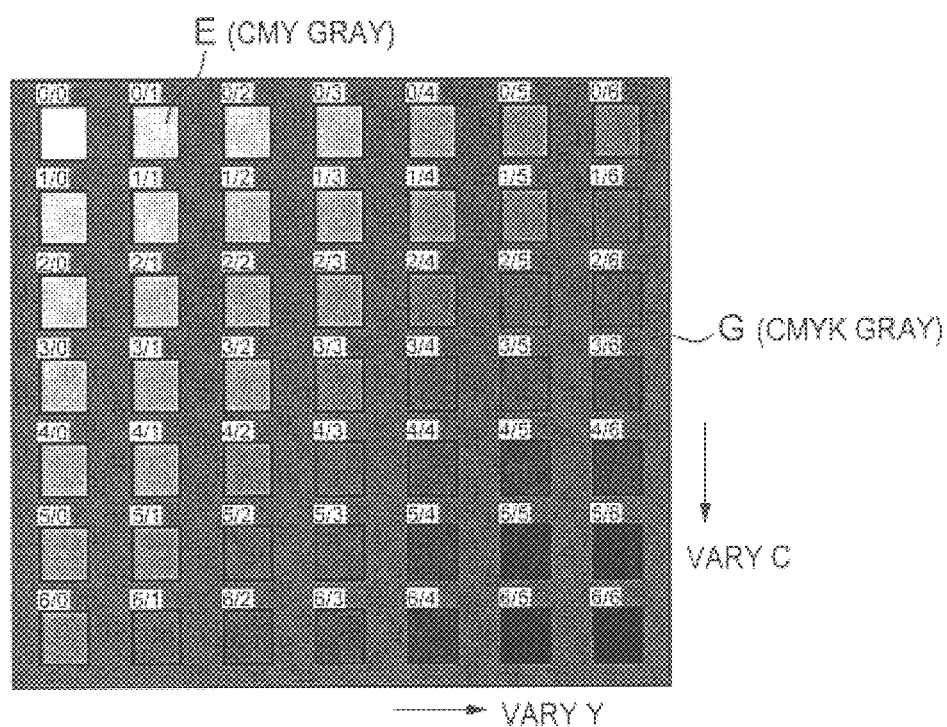
FIG. 10 is an illustration of an adjustment sheet according to a second embodiment of the present invention.

A description will now be given of a second embodiment of the present invention. FIG. 10 is an illustration of an adjustment sheet according to the second embodiment of the present invention.

In the above-mentioned first embodiment, K is added to the CMY gray patch so as to make the color tone of the CMY gray patches less recognizable. On the other hand, according to the present embodiment, CMY mixture gray is added to the K gray patch (a section G of FIG. 10) so as to add a color tone so that the color tone of the CMY mixture gray patches E is less recognizable. In this case, the gray patch of the section G corresponds to a test pattern and the gray patches of the sections E correspond to test patterns.

Figure 11:
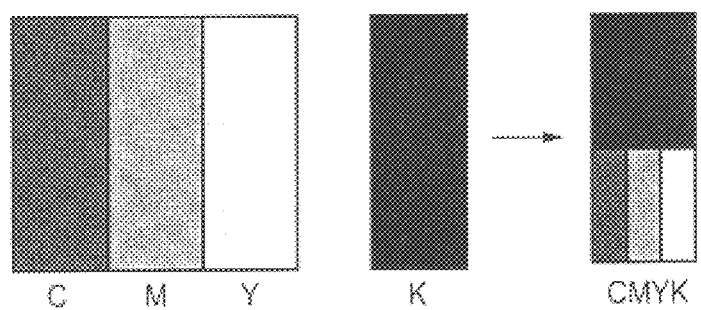
FIG. 11 is an illustration showing an area ratio of a K gray patch to which CMY mixture gray is added.

FIG. 11 is an illustration showing an area ratio of the thus-produced K gray patch to which CMY mixture gray is added. Since it is supposed that the concentration value of CMY to be added varies depending on a magnitude of color tone appearing in the CMY mixture gray, the concentration to be adjusted (for example, 25%) or a color distribution of toner ink, the concentration of CMY which lessen a color tone is found experimentally by determining a target when designing. Moreover, the concentration of CMY to be added may be changed within a range determined experimentally when an adjustment is carried out. If a user can be set the concentration of CMY through an operation panel, the user can select an appropriate concentration at which the user can carry out the determination easily. Moreover, if the concentration of CMY to be added is not subjected to a gray adjustment, a gap is also generated between the adjustment values of CMY to be adjusted. This problem can be avoided by adding CMY of which concentration is adjusted by a conventional method.

A description will now be given of a γ-correction calculation. The γ-correction based on the actually determined concentration is the same as that applied to a monochrome image. Therefore, a concentration correction can be applied by performing a γ-correction calculation as follows.

Figure 12:
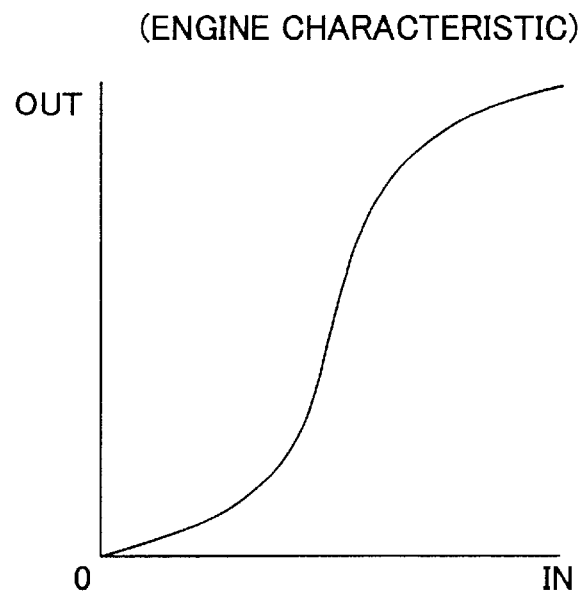
FIG. 12 is a graph showing an example of an input-and-output characteristic of a printer engine.
Figure 13:
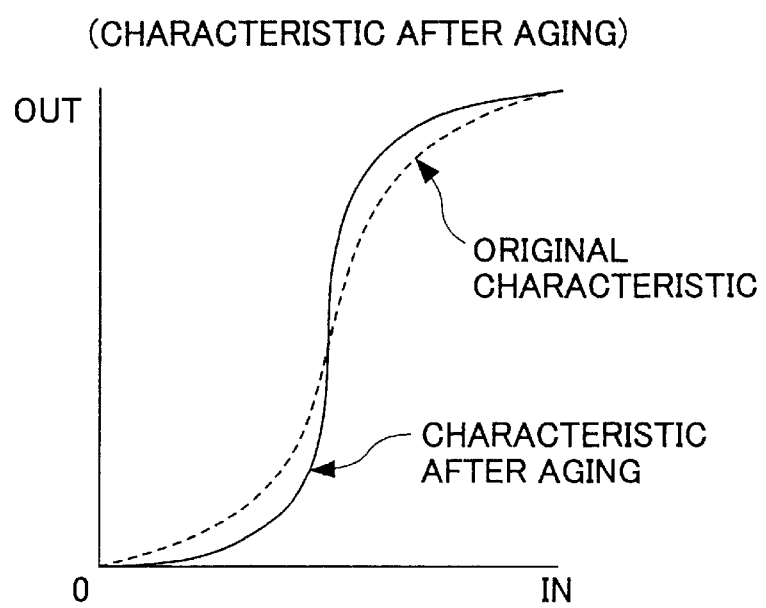
FIG. 13 is a graph showing an input-and-output characteristic after aging.

FIG. 12 is a graph showing an example of an input-and-output characteristic of a printer engine. It can be appreciated from the graph of FIG. 2, that a concentration achieved by the printer engine becomes lower in a low concentration range, and a concentration achieved by the printer engine in a high concentration range becomes higher. Moreover, as shown in FIG. 13, due to aging of the printer engine, a gain is further reduced in the low concentration range, and a gain in the higher concentration range is further increased.

Figure 14:
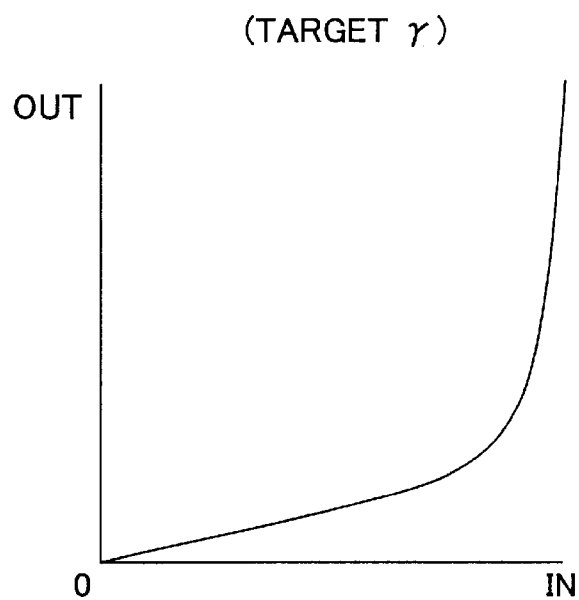
FIG. 14 is a graph showing a desirable output characteristic (target γ) of a printer engine.
Figure 15:
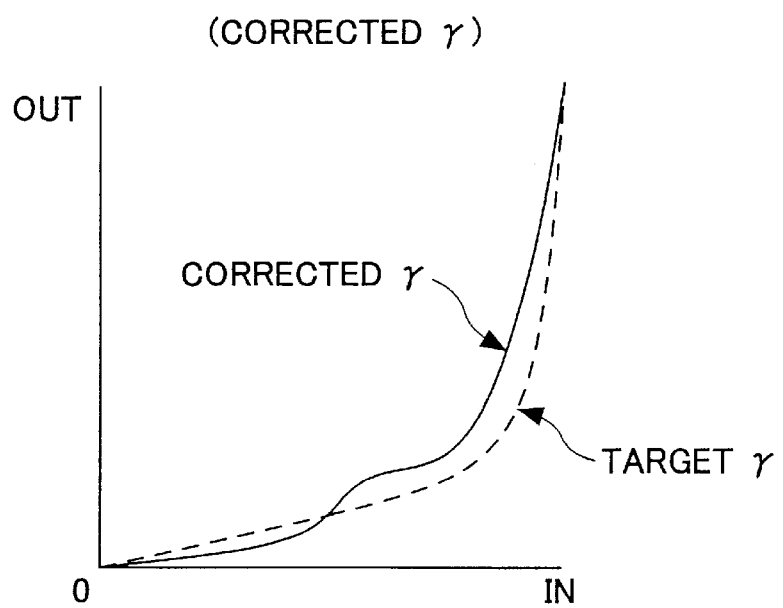
FIG. 15 is a graph showing a corrected γ-curve.

FIG. 14 is a graph showing a desirable output characteristic (target γ) of the printer engine. A correction is made so as to match the input-and-output characteristic shown in FIG. 12 to the characteristic shown in FIG. 14. FIG. 15 is a graph showing a corrected γ-curve obtained by the above-mentioned correction. When the printer input-and-output characteristic changes as shown in FIG. 13 due to a change with passage of time, a γ-correction is applied so as to obtain a printer input-and-output characteristic shown in FIG. 16. In the input-and-output characteristic of the printer shown in FIG. 16, a degree of change is relatively large in a low concentration range since a gain of a target is originally low as shown in FIG. 12. On the other hand, in a middle and high concentration range, a degree of change is not so large as that of the low concentration range.

Figure 16:
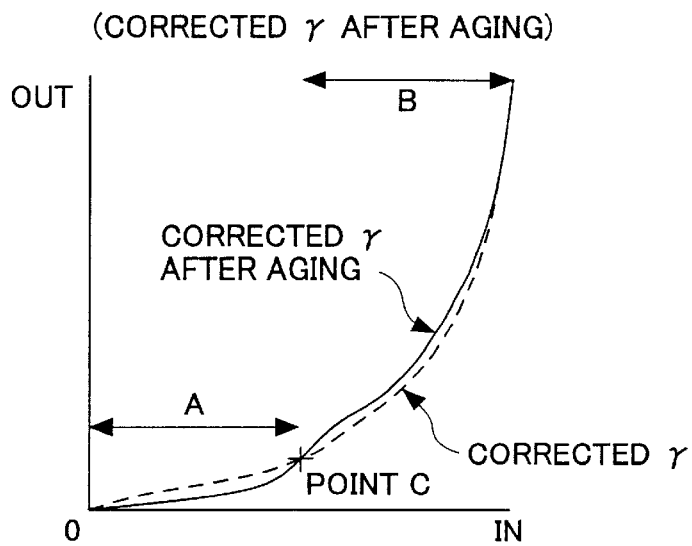
FIG. 16 is a graph showing a corrected γ-curve after aging.
Figure 17A:
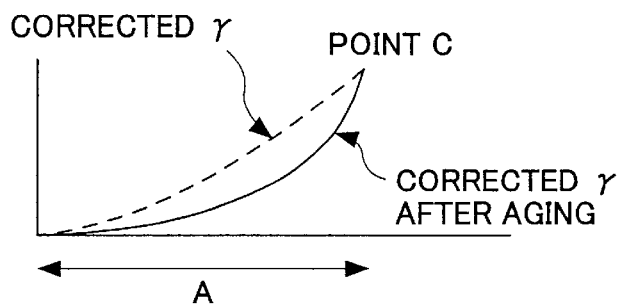
FIG. 17A is a graph showing a part of the γ-curve in a low concentration range.
Figure 17B:
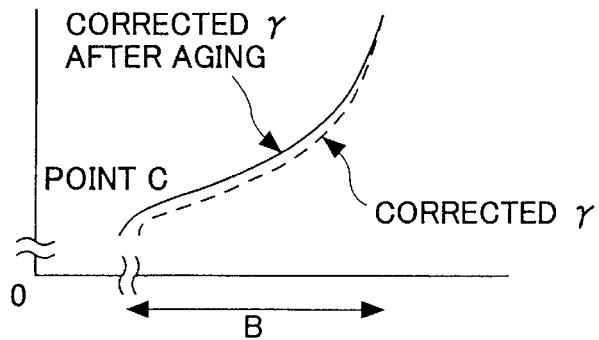
FIG. 17B is a graph showing a part of the γ-curve in a high concentration range.
Figure 18A:
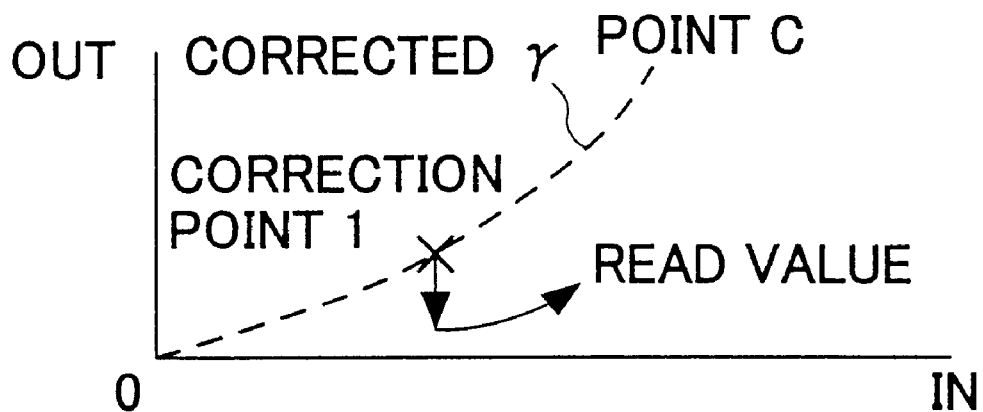
FIG. 18A is a graph showing a shift of a reading value corresponding to a connection point 1.
Figure 18B:
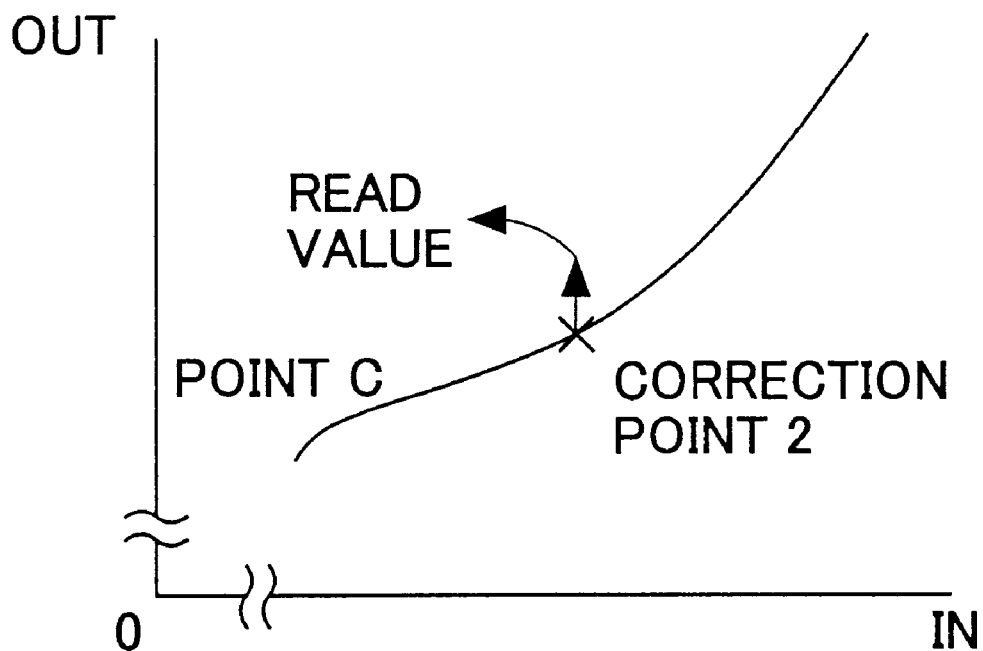
FIG. 18B is a graph showing a shift of a reading value corresponding to a connection point 2.

Accordingly, in the present embodiment, the γ-correction is made by separately for a low concentration range A and a high concentration range B as shown in FIG. 16. Such a separation can be made at a point C near an inflection point of the γ-curve. FIG. 17A is a graph showing a part of the γ-curve in the low concentration range A, and FIG. 17B is a graph showing a part of the γ-curve in the high concentration range B. A correction point 1 is derived from the part of the γ-curve between the point C and lowest concentration point which is zero, as shown in FIG. 18A. Additionally, a correction point 2 is derived from the part of the Y-curve between the point C and the highest concentration point which is 255, as shown in FIG. 18B. As mentioned above, the point C can be obtained as a point near an inflection point of the quadratic curve, which represents the input-and-output characteristic of the printer engine.

In the present embodiment, concentration at each of these correction points 1 and 2 is beforehand memorized as a color sample test pattern. Then color correction test data is created and output based on the color sample test pattern. An operation of obtaining a corrected concentration value can be carried out by reading the output color correction data by a scanner or a visual check by a user.

Figure 19A:
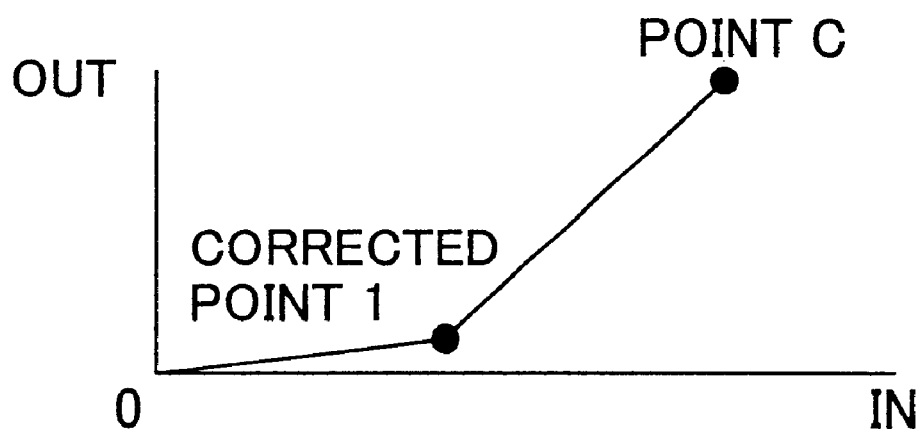
FIG. 19A is a graph showing the corrected point 1 connected by straight lines.
Figure 19B:
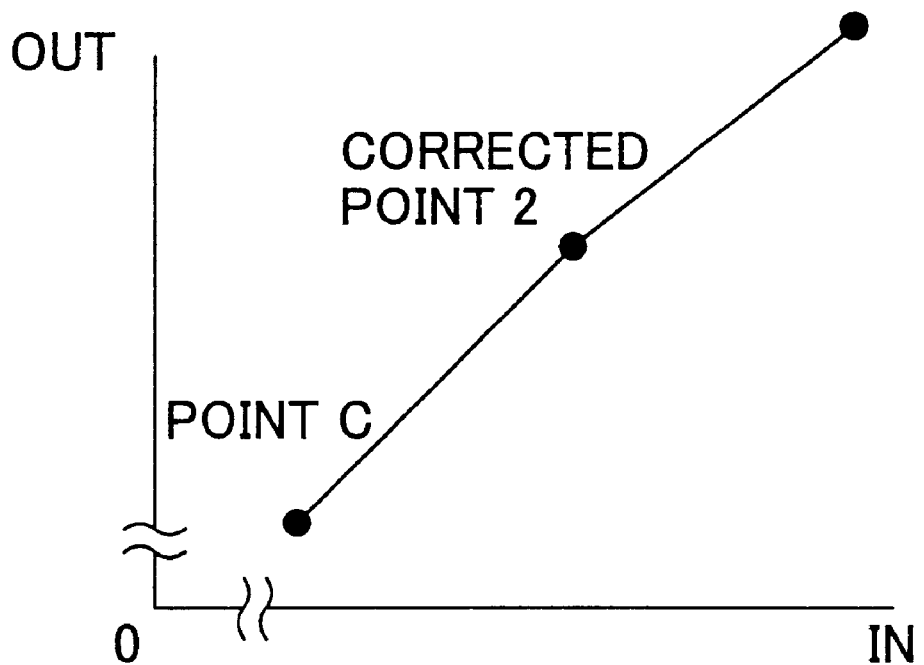
FIG. 19B is a graph showing the corrected point 2 connected by straight lines.
Figure 20:
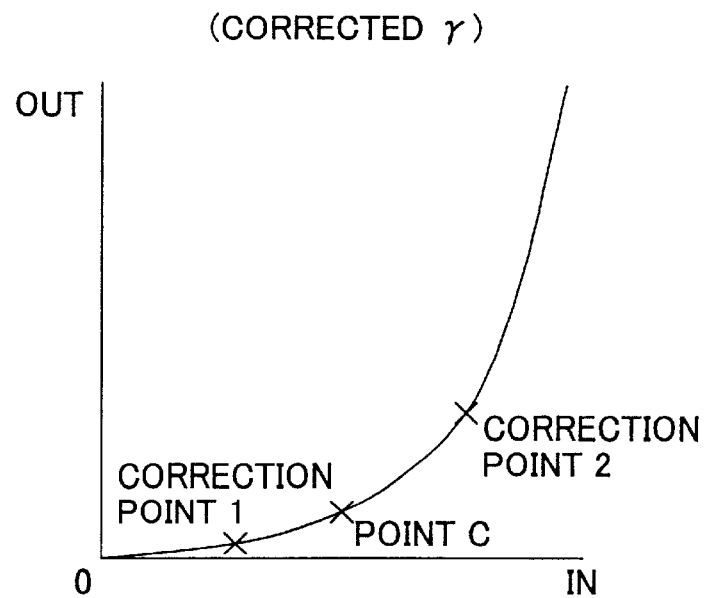
FIG. 20 is a graph showing a corrected γ-curve produced by interpolation.

FIGS. 18A and 18B show shifts of reading values corresponding to the connection points 1 and 2, that is, offsets of concentration values at the present time with respect to the correction values are shown. It can be appreciated that each reading value is shifted from the corresponding correction value as indicated by arrows in the figure. A user inputs the correction value for each of the correction points 1 and 2. Then, a controller calculates corrected γ-curve shown in FIGS. 19A and 19B from the correction values for the correction points 1 and 2. The corrected γ-curves shown in FIGS. 19A and 19B are obtained by connecting each correction point by straight lines. The graph of FIG. 20 is obtained by combining the graphs of FIGS. 19A and 19B, and interpolating the combined curves by a curve such as a Bezier curve or a spline curve. It can be appreciated that the corrected γ-curve shown in FIG. 16 approximates the corrected γ-curve shown in FIG. 16.

Thus, although there are few correction points, a sufficient correction can be made by deriving two correction points, one is for a low concentration range and the other for a middle and high concentration range. That is, a sufficient correction can be carried out by selecting correction points in respective areas according to the feature of the input-and-output characteristic of the printer.

Figure 21:
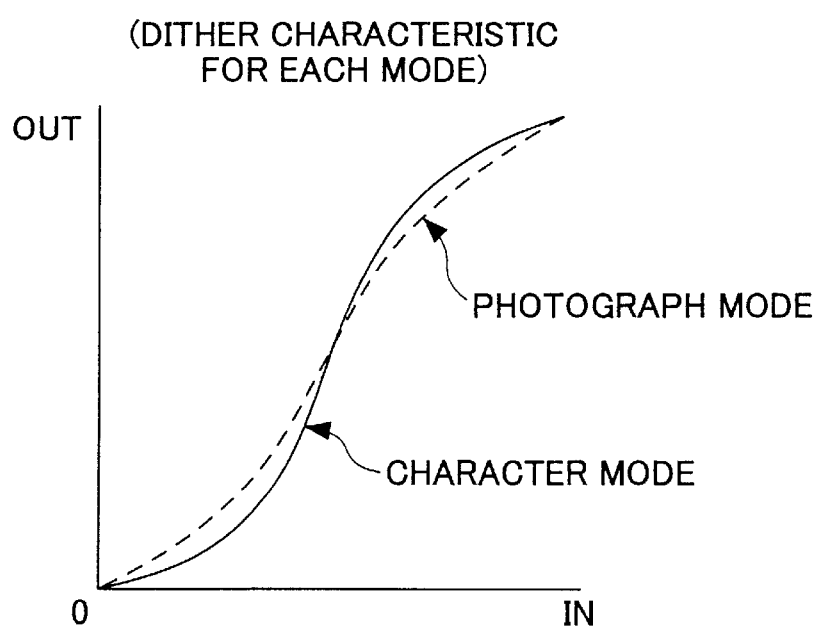
FIG. 21 is a graph showing a dither characteristic of a photograph mode and a character mode.

In a case of a color printer, it is preferable to provide the corrected γ-curve for each color component since the characteristic of the printer engine differs depending on each color component. The corrected γ-curve can be obtained by setting correction points in the same manner as mentioned above. Moreover, since gradation process (dithering) differs for drawing modes like a character and a photograph as well as a color mode, the engine characteristics after being subjected to a gradation process differ from each other as shown in FIG. 21. Similarly, in this case, the above-mentioned method is applicable by increasing the number of correction points. Furthermore, the corrected γ-curve can be obtained for each color mode (CMYK) and drawing mode (character/photograph), for example 4×2=8 corrected γ-curves can be obtained.

As mentioned above, the image forming method according to the present embodiment comprises the steps of: producing a plurality of concentration ranges by equidividing a range between the highest concentration and the lowest concentration in a color printing, and producing a concentration pattern consisting of a reference concentration; printing the concentration pattern on the same print paper; and correcting the input-and-output characteristic of the image forming apparatus based on a corrected concentration value.

A program for carrying out the above-mentioned process steps can be stored in a recording medium such as a floppy disk (FD) or a CD-ROM. The recording medium may be attached to the host computer 1 shown in FIG. 1, and the program may be read by the host computer 1 so that the above-mentioned process steps can be carried out by the host computer 1 controlling the printer controller 3 through the host I/F.

Here, as shown in FIGS. 22A–22E, the concentration of CMY to be added to the K gray patch may be changed according to various changes in operating conditions such as a resolution, a type of printer engine, a consumable parts counter value, an amount of remaining toner or each transfer color component. The data regarding the concentration of CMY to be added is stored in a nonvolatile memory, such as the program ROM, a hard disk drive (HDD) or a non-volatile RAM (NVRAM), provided in the printer controller 3. FIGS. 23A–23E shows an example of the contents of the data stored in the nonvolatile memory. Then, the concentration value of CMY to be added is read from the memory in accordance with the selected operating conditions so as to produce the K gray patch containing CMY of an appropriate concentration.

In the printer which can select a plurality of resolutions, when changing the CMY concentration value to be added for each resolution, a user designates a resolution to be used through an operation panel. According to the designation, the printer controller 3 acquires, for example, from the table shown in FIG. 23A the CMY concentration value to be added. In the example shown in FIG. 23A, when the designated resolution is 1200 dpi, CMY concentration is set to 10%, and when the designated resolution is 600 dpi, CMY concentration is set to 14%.

When a plurality of printer engines are connected to the printer controller 3, the printer controller 3 determines the CMY concentration value to be used from the table shown in FIG. 23B based on the printer engine 2 specified at the time of start of a printing operation. In the example shown in FIG. 23B, when using the printer engine A, CMY concentration is set to 10%, and when using the printer engine B, CMY concentration is set to 7%.

A consumable parts counter may be provided in the printer engine 2 so as to count a service time of consumable parts provided in the printer engine 2. When changing a CMY concentration value based on a count value of the consumable parts counter value, data of the count value of the consumable parts counter stored in the printer controller 3 or the printer engine 2 is read, and a CMY concentration value is determined from the table of FIG. 23C according to the read value. In the example shown in FIG. 23B, when the consumable parts counter value is smaller than 1000, CMY concentration is set to 10%; when the consumable parts counter value is equal to or greater than 1000 and smaller than 2000, CMY concentration is set to 14%; when the consumable parts counter value is equal to or greater than 2000 and smaller than 3000, CMY concentration is set to 10%; when the consumable parts counter value is equal to or greater than 3000 and smaller than 4000, CMY concentration is set to 7%.

The printer engine 2 may be provided with a detector for detecting an amount of remaining toner. When changing a CMY concentration value based on an amount of toner consumption (an amount of remaining toner), information regarding an amount of remaining toner stored in the printer controller 3 or the printer engine 2 is read, and a CMY concentration value is determined from the table of FIG. 23D according to the read value. In the example shown in FIG. 23D, when an amount of remaining toner is 100%, CMY concentration is set to 10%, when an amount of remaining toner is 80%, CMY concentration is set to 11%, and when an amount of remaining toner is 10%, CMY concentration is set to 15%.

When changing a CMY concentration value by each color component, each of the concentration values of CMY is separately stored, as shown in the table of FIG. 23E. Accordingly, a CMY concentration value is determined by reading each of the concentration values of CMY from the table. In the example shown in FIG. 23E, when an amount of remaining toner is 80%, a concentration of C is set to 12%, a concentration of M is set to 11% and a concentration of Y is set to 10% so that an overall concentration of CMY is set to 11%.

It should be noted that a program for carrying out the method of adjusting concentration of gray described in the above-mentioned first and second embodiments can be stored in a recording medium such as a floppy disk (FD) or a CD-ROM. The recording medium may be attached to the host computer 1 shown in FIG. 1, and the program may be read by the host computer 1 so that the above-mentioned method is carried out by the host computer 1 controlling the printer controller 3 through the host I/F.

The present invention is not limited to the specifically disclosed embodiment, and variations and modifications may be made without departing from the scope of the present invention.

The present invention is based on Japanese priority applications No. 2000-318299 filed on Oct. 18, 2000, No. 2001-085716 filed on March 23 and No. 2001-071659 filed on Mar. 14, 2001, the entire contents of which are hereby incorporated by reference.

What is claimed is:

1. An image forming apparatus comprising:

concentration pattern data producing means for producing reference concentration pattern data and adjustment concentration pattern data, the reference concentration pattern data representing a predetermined reference concentration and the adjustment concentration pattern data representing a plurality of concentrations within a predetermined concentration range including the predetermined reference concentration;

printing means for printing an adjustment sheet based on the reference pattern data and the adjustment concentration pattern data so that a reference pattern and a plurality of test patterns are printed on the adjustment sheet, the reference pattern indicating the predetermined reference concentration and the test patterns indicating the concentrations indicated by the adjustment concentration pattern data; and concentration adjusting means for adjusting concentration data of image data to be printed in accordance with an adjustment concentration value detected by comparing a concentration of the reference pattern with concentrations of the test patterns printed on the adjustment sheet, wherein said concentration pattern data producing means produces the reference concentration pattern data and the adjustment concentration pattern data so that one of a color of the reference pattern and a color of the test patterns is added to the other of the color of the test pattern and the color of the test patterns.

2. The image forming apparatus as claimed in claim 1, wherein the color of the reference pattern is gray consisting of monochromatic black, and the color of the test patterns is gray consisting of a mixture of cyan, magenta and yellow, and wherein the concentration pattern data producing means produces the reference concentration pattern data and the adjustment concentration pattern data so as to add the color of the reference pattern to the color of the test patterns so that the printing means prints the reference pattern in gray consisting of monochromatic black and prints the test patterns in gray which is a mixture of cyan, magenta yellow and black.

3. The image forming apparatus as claimed in claim 2, wherein said printing means prints the test patterns so as to be arranged within the reference pattern so that each of the test patterns is surrounded by the reference pattern and the concentrations of the test patterns are gradually increased or decreased within the predetermined concentration range, thereby facilitating comparison of the reference pattern and each of the test patterns.

4. The image forming apparatus as claimed in claim 2, wherein said adjustment concentration pattern data producing means produces the reference pattern data with monochromatic black of which concentration is previously adjusted.

5. The image forming apparatus as claimed in claim 1, wherein the color of the reference pattern is gray consisting of monochromatic black, and the color of the test patterns is gray consisting of a mixture of cyan, magenta and yellow, and wherein the concentration pattern data producing means produces the reference concentration pattern data and the adjustment concentration pattern data so as to add the color of the test patterns to the color of the reference patterns so that the printing means prints the reference pattern in gray consisting of monochromatic black and a mixture of cyan, magenta and yellow, and prints the test patterns in gray consisting of cyan, magenta and yellow.

6. The image forming apparatus as claimed in claim 5, wherein said printing means prints the test patterns so as to be arranged within the reference pattern so that each of the test patterns is surrounded by the reference pattern and the concentrations of the test patterns are gradually increased or decreased within the predetermined concentration range, thereby facilitating comparison of the reference pattern and each of the test patterns.

7. The image forming apparatus as claimed in claim 5, wherein said adjustment concentration pattern data producing means produces the reference concentration pattern data with monochromatic black of which concentration is previously adjusted.

8. The image forming apparatus as claimed in claim 5, wherein the image data is printed according to one of a plurality of resolutions, and said adjustment concentration pattern data producing means produces the reference concentration pattern data so as to match with a selected one of the resolutions by changing an amount of gray, which is a mixture of cyan, magenta and yellow, added to the monochromic black.

9. The image forming apparatus as claimed in claim 5, wherein the image data is printed by one of a plurality of print engines, and said adjustment concentration pattern data producing means produces the reference concentration pattern data so as to match with a selected one of the printer engines by changing an amount of gray, which is a mixture of cyan, magenta and yellow, added to the monochromic black.

10. The image forming apparatus as claimed in claim 5, further comprising a consumable parts counter for counting a service time of consumable parts, and said adjustment concentration pattern data producing means produces the reference concentration pattern data so as to match with a current condition of the image forming apparatus by changing an amount of gray, which is a mixture of cyan toner, magenta toner and yellow toner, added to the monochromic black in accordance with a current count value of said consumable parts counter.

11. The image forming apparatus as claimed in claim 5, further comprising a remaining toner detector for detecting an amount of remaining toner, and said adjustment concentration pattern data producing means produces the reference concentration pattern data so as to match with a current condition of the image forming apparatus by changing an amount of gray, which is a mixture of cyan, magenta and yellow, added to the monochromic black in accordance with a current amount of remaining toner detected by remaining toner detector.

12. The image forming apparatus as claimed in claim 11, wherein said adjustment concentration pattern data producing means changes an amount of cyan, magenta and yellow on an individual color basis.

13. A method of adjusting a concentration of gray in a printed color image, comprising the steps of:
producing reference concentration data, wherein said reference concentration data represents a predetermined reference concentration;
producing adjustment concentration pattern data, wherein said adjustment concentration pattern data represents a plurality of concentrations within a predetermined concentration range, including the predetermined reference concentration;
printing an adjustment sheet based on the reference pattern data and the adjustment concentration pattern data so that a reference pattern and a plurality of test patterns are printed on the adjustment sheet, wherein the reference pattern indicates the predetermined reference concentration and the test patterns indicate the concentrations indicated by the adjustment concentration pattern data;
comparing a concentration of the reference pattern with the concentrations of the test patterns printed on the adjustment sheet to detect an adjustment concentration value; and
adjusting concentration data of image data to be printed in accordance with an adjustment concentration value detected, wherein said reference concentration pattern data and adjustment concentration pattern data are arranged so that a color from the reference pattern and a color of the test pattern is added to another of the color of the test patterns.

14. The method according to claim 13, wherein the color of the reference pattern is gray, based from monochromatic black.

15. The method according to claim 13, wherein the color of the test pattern is gray, based upon a mixture of cyan, magenta and yellow.

16. The method according to claim 13, wherein the color of the test pattern is gray, based upon a mixture of cyan, magenta, yellow and black.

17. A computer readable medium having computer readable code embodied therein for causing a computer to adjust a concentration of gray in a printed color image, comprising:
code for producing reference concentration data, wherein said reference concentration data represents a predetermined reference concentration;

code for producing adjustment concentration pattern data, wherein said adjustment concentration pattern data represents a plurality of concentrations within a predetermined concentration range, including the predetermined reference concentration;

code for printing an adjustment sheet based on the reference pattern data and the adjustment concentration pattern data so that a reference pattern and a plurality of test patterns are printed on the adjustment sheet, wherein the reference pattern indicates the predetermined reference concentration and the test patterns indicate the concentrations indicated by the adjustment concentration pattern data;

code for comparing a concentration of the reference pattern with the concentrations of the test patterns printed on the adjustment sheet to detect an adjustment concentration value; and code for adjusting concentration data of image data to be printed in accordance with an adjustment concentration value detected, wherein said reference concentration pattern data and adjustment concentration pattern data are arranged so that a color from the reference pattern and a color of the test pattern is added to the color of the test patterns.

18. A computer readable medium according to claim 17, wherein the color of the reference pattern is gray, based from monochromatic black.

19. A computer readable medium according to claim 17, wherein the color of the test pattern is gray, based upon a mixture of cyan, magenta and yellow.

20. A computer readable medium according to claim 17, wherein the color of the test pattern is gray, based upon a mixture of cyan, magenta, yellow and black.

* * * * *

UNITED STATES PATENT AND TRADEMARK OFFICE
CERTIFICATE OF CORRECTION

PATENT NO.     : 6,556,793 B2
DATED          : April 29, 2003
INVENTOR(S)    : Satoru Nakamura It is certified that error appears in the above-identified patent and that said Letters Patent is hereby corrected as shown below:

<u>Title page,</u>
Item [30], Foreign Application Priority Data, "2000-071659" should read -- 2001-071659 --

Signed and Sealed this

Twenty-third Day of September, 2003

JAMES E. ROGAN
*Director of the United States Patent and Trademark Office*